United States Patent
Li (10) Patent No.: US 11,733,927 B2
(45) Date of Patent: Aug. 22, 2023

(54) HYBRID SOLID-STATE DRIVE

(71) Applicant: Microsoft Technology Licensing, LLC, Redmond, WA (US)

(72) Inventor: Peng Li, Beaverton, OR (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 63 days.

(21) Appl. No.: 17/538,871

(22) Filed: Nov. 30, 2021

(65) Prior Publication Data

US 2023/0168840 A1 Jun. 1, 2023

(51) Int. Cl.
G06F 12/00 (2006.01)
G06F 3/06 (2006.01)
G06F 12/02 (2006.01)

(52) U.S. Cl.
CPC ............ *G06F 3/0659* (2013.01); *G06F 3/064* (2013.01); *G06F 3/0619* (2013.01); *G06F 3/0679* (2013.01); *G06F 12/0246* (2013.01); *G06F 2212/7201* (2013.01)

(58) Field of Classification Search
CPC ...... G06F 3/0659; G06F 3/0619; G06F 3/064; G06F 3/0679; G06F 12/0246; G06F 2212/7201
USPC .......................................................... 711/154
See application file for complete search history.

(56) References Cited

U.S. PATENT DOCUMENTS

| | | | |
|---|---|---|---|
| 2016/0070496 A1* | 3/2016 | Cohen | G06F 3/0644 711/103 |
| 2017/0060436 A1 | 3/2017 | Trika et al. | |
| 2018/0095872 A1* | 4/2018 | Dreier | H04L 67/1095 |
| 2019/0095116 A1 | 3/2019 | Igahara et al. | |
| 2019/0303284 A1 | 10/2019 | Trika et al. | |
| 2021/0096778 A1 | 4/2021 | Nagarajan et al. | |

FOREIGN PATENT DOCUMENTS

JP 4079506 B2 * 4/2008 ......... G06F 12/0246

OTHER PUBLICATIONS

"International Search Report and Written Opinion Issued in PCT Application No. PCT/US22/042595", dated Dec. 23, 2022, 14 Pages.

* cited by examiner

*Primary Examiner* — Mardochee Chery
(74) *Attorney, Agent, or Firm* — Weaver IP L.L.C.

(57) ABSTRACT

Systems, methods, and devices are described for writing to a solid-state drive (SSD) that includes a non-volatile memory device, the volatile memory device includes first and second memory regions, the first memory region storing an address mapping table. A write request that includes a host logic block address (LBA) and data is received. A determination of whether the received LBA corresponds to the non-volatile memory device or the second memory region is made. In response to the received LBA corresponding to the non-volatile memory device, a physical address of the non-volatile memory device corresponding to the received LBA is determined based on the address mapping table and the included data is written to the determined physical address of the non-volatile memory device. In response to the received LBA corresponding to the second memory region, the included data is written to the second memory region based on the received LBA.

20 Claims, 6 Drawing Sheets

```
┌─────────────────────────────────────────────────────────────┐ 342
│ Convert the received LBA to a corresponding physical address of the second │
│                         memory region                        │
└─────────────────────────────────────────────────────────────┘
                                │
                                ▼
┌─────────────────────────────────────────────────────────────┐ 344
│ Write the included data to the corresponding physical address of the second │
│                         memory region                        │
└─────────────────────────────────────────────────────────────┘
```

| Namespace | LBA Range | Media |
|-----------|-----------|-------|
| 0 | 0 : (X-1) | Second Memory region of VM |
| 1 | X : (Y-1) | Non-Volatile Memory |

```
┌─────────────────────────────────────────────────────────────┐ 502
│ In response to a power down event, write data stored in the second memory │
│       region to the non-volatile memory device as backup data │
└─────────────────────────────────────────────────────────────┘
                                │
                                ▼
┌─────────────────────────────────────────────────────────────┐ 504
│ In response to a power up event, write the backup data stored in the non-volatile │
│           memory device to the second memory region          │
└─────────────────────────────────────────────────────────────┘
```

HYBRID SOLID-STATE DRIVE

BACKGROUND

Solid state drives (SSDs) are storage devices that use integrated circuits to store data persistently. An SSD may include volatile memory storage and non-volatile memory storage. Typically, the volatile memory storage used to store an address mapping table for mapping logic block addresses (LBA) to physical addresses of the non-volatile memory storage. A controller of the SSD accesses the address mapping table to determine which physical address corresponds to an LBA (in the non-volatile memory storage) referenced in a read or write request. A portion of the volatile memory storage is typically unused.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are described for utilizing a solid-state drive (SSD) that includes a non-volatile memory device. The volatile memory device includes first and second memory regions. The first memory region stores an address mapping table. In one aspect, data is written to the SSD. A write request is received that includes a host logic block address (LBA) and data. A determination is made of whether the received LBA corresponds to the non-volatile memory device or the second memory region. In response to the received LBA corresponding to the non-volatile memory device, a physical address of the non-volatile memory device corresponding to the received LBA is determined based on the address mapping table and the included data is written to the determined physical address of the non-volatile memory device. In response to the received LBA corresponding to the second memory region, the included data is written to the second memory region based on the received LBA.

In a further aspect, data is read from the SSD. A read request that includes the LBA is received. A determination of whether the received LBA corresponds to the non-volatile memory device or the second memory region is made. In response to the received LBA corresponding to the non-volatile memory device, the physical address of the non-volatile memory device corresponding to the received LBA is determined based on the address mapping table and data is read from the determined physical address of the non-volatile memory device. In response to the received LBA corresponding to the second memory region, data is read from a physical address of the second memory region corresponding to the received LBA.

Further features and advantages of the embodiments, as well as the structure and operation of various embodiments, are described in detail below with reference to the accompanying drawings. It is noted that the claimed subject matter is not limited to the specific examples described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

The example embodiments described herein are provided for illustrative purposes and are not limiting. The examples described herein may be adapted to any type of method or system for utilizing unused volatile memory storage space for storing non-volatile data. Further structural and operational embodiments, including modifications/alterations, will become apparent to persons skilled in the relevant art(s) from the teachings herein.

Note that the variable "N" is appended to various reference numerals in several drawings/figures identifying illustrated components to indicate that the number of such components is variable, for example, with any value of 2 and greater. Note that for each distinct component/reference numeral, the variable "N" has a corresponding value, which may be different for the value of "N" for other components/reference numerals. The value of "N" for any particular component/reference numeral may be less than 10, in the 10s, in the hundreds, in the thousands, or even greater, depending on the particular implementation.

Numerous exemplary embodiments are now described. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Hybrid Solid State Drive Embodiments

Solid state drives (SSDs) are storage devices that use integrated circuits to store data persistently. SSDs may include a controller configured to receive read and write requests from a host computing device. The read and write requests may include an LBA corresponding to a physical address of a memory portion of the SSD. The controller is configured to read data from or write data to the physical address based on the LBA. SSDs may include multiple types of memory portions. For example, an SSD in accordance with an embodiment includes a volatile memory portion and non-volatile memory portion. The volatile memory portion may include volatile memory devices such as double data rate (DDR) memory devices, synchronous random-access memory (SRAM) devices, dynamic random-access memory (DRAM) devices, and/or the like. The non-volatile memory portion may include non-volatile memory devices may include flash memory storage devices (e.g., NAND flash, NOR flash, etc.), non-volatile random-access memory (NVRAM), and/or the like. For instance, in accordance with an embodiment, an SSD includes DDR memory devices and NAND flash memory devices.

The volatile memory portion may be configured to store an address mapping table that maps LBAs to physical address of the datacenter SSD. Depending on the particular implementation, a portion of the volatile memory storage space of the volatile memory devices may be unused. For instance, an SSD in accordance with an embodiment has a non-volatile storage capacity measured as a power of 10, e.g., 4 TB, or $4 \times 10^{12}$ bytes. The size of the address mapping table is proportionate to the non-volatile storage capacity, e.g., 0.1% of the non-volatile storage capacity, in this example 4 GB, or $4 \times 10^9$ bytes. In an embodiment, the volatile memory storage capacity of the SSD is configured according to a power of 2, for instance 4GiB, or $4 \times 2^{30}$ bytes. In this example, 294,967,296 bytes of volatile memory storage space are unused.

Embodiments and techniques of the present disclosure relate to configuring unused volatile memory storage space as an additional storage space. This additional storage space may be used as if it were a non-volatile memory storage space. For instance, the additional storage space may be used to store data such as data files, host application metadata files, and/or the like. Embodiments may be implemented in a manner that separates the additional storage space from the volatile memory storage space used to store the address mapping table. For example, the volatile memory storage space in accordance with an embodiment is partitioned into a first memory region and a second memory region. The first memory region is configured to store an address mapping table and the second memory region is configured as the additional storage space. In accordance with a further embodiment, the first memory region includes a reserved portion of storage space for storing data such as system variables.

A hybrid SSD, according to embodiments herein, is an SSD configured to store data in either of its non-volatile memory storage space or its available volatile memory storage space (i.e., the storage space not used to store an address mapping table). For example, a hybrid SSD in accordance with an embodiment may provide one or more of the following features.

Increased Quality of Service. Embodiments provide a storage option with latency lower than the latency of the non-volatile memory storage space. For instance, DDR memory devices typically have a lower latency than NAND flash memory devices.

Reduced Write Amplification. Implementations of non-volatile memory devices may have a write cycle limit. For instance, a physical address of a NAND flash memory device may be written to a certain number of times before the cell associated with the physical address is unusable or unreliable. Embodiments provide a storage option that does not consume write cycles of non-volatile memory devices. Furthermore, write amplification is reduced if a write request is received with a memory address corresponding to the additional storage space. In this context, no write cycle of the non-volatile memory device is consumed to write data to the additional storage space. Applications, such as a key-value data store or journal file system, may use the additional storage space to reduce write cycles consumed.

Reduced Total Cost of Ownership (TCO). Embodiments of the present disclosure may be implemented without an increase to build of material (BOM) costs. For instance, more non-volatile memory physical storage capacity is available as logical storage capacity while overall write amplification is reduced. Furthermore, long term costs are reduced due to the reduction of overall write cycle consumption.

Embodiments of hybrid SSDs are configured to receive read and write requests. These requests include a memory address corresponding to a physical address of the hybrid SSD. The memory address may be a logic block address (LBA). The hybrid SSD is configured to read data from or write data to the physical address based on the memory address. Memory address space may be divided into multiple partitions. For example, in accordance with an embodiment, memory addresses are divided into a first partition corresponding to the second memory region of the volatile memory storage space and a second partition corresponding to the non-volatile memory storage space. A hybrid data storage manager of the hybrid SSD directs data traffic (e.g., read and write requests) to the partition that the memory address corresponds to. In accordance with an embodiment, the hybrid data storage manager accesses the partition corresponding to the second memory region of the volatile memory storage space without referring to the address mapping table stored in the first memory region of the volatile memory storage space.

Hybrid SSDs may be utilized in various applications. For instance, a hybrid SSD may be implemented as an external hard drive, a hard drive of a computing device, a hard drive within a storage server, a hard drive within a datacenter, and/or the like. An external hard drive is a hard drive that may be connected to a computing device. A computing device may be any type of stationary or mobile computing device, including mobile computing device (e.g., a Microsoft® Surface® device, a personal digital assistant (PDA), a laptop computer, a notebook computer, a tablet computer such as an Apple iPad™, a netbook, and/or the like), a mobile phone, a wearable computing device, or other type of mobile device, or a stationary computing device such as a desktop computer or a server. A storage server is configured to manage and access files stored in memory devices. A storage server may be a standalone storage server or a server in a server rack (e.g., 8-40 servers per rack, referred to as nodes or "blade servers"), in a server cluster (e.g., 2-64 servers, 4-8 racks, or other numbers of servers and/or racks), or in a datacenter (e.g., thousands of servers, hundreds of racks, and/or dozens of clusters). A datacenter is a group of co-located servers (e.g., housed in one or more nearby buildings with associated components such as backup power supplies, redundant data communications, and environmental controls).

Figure 1:
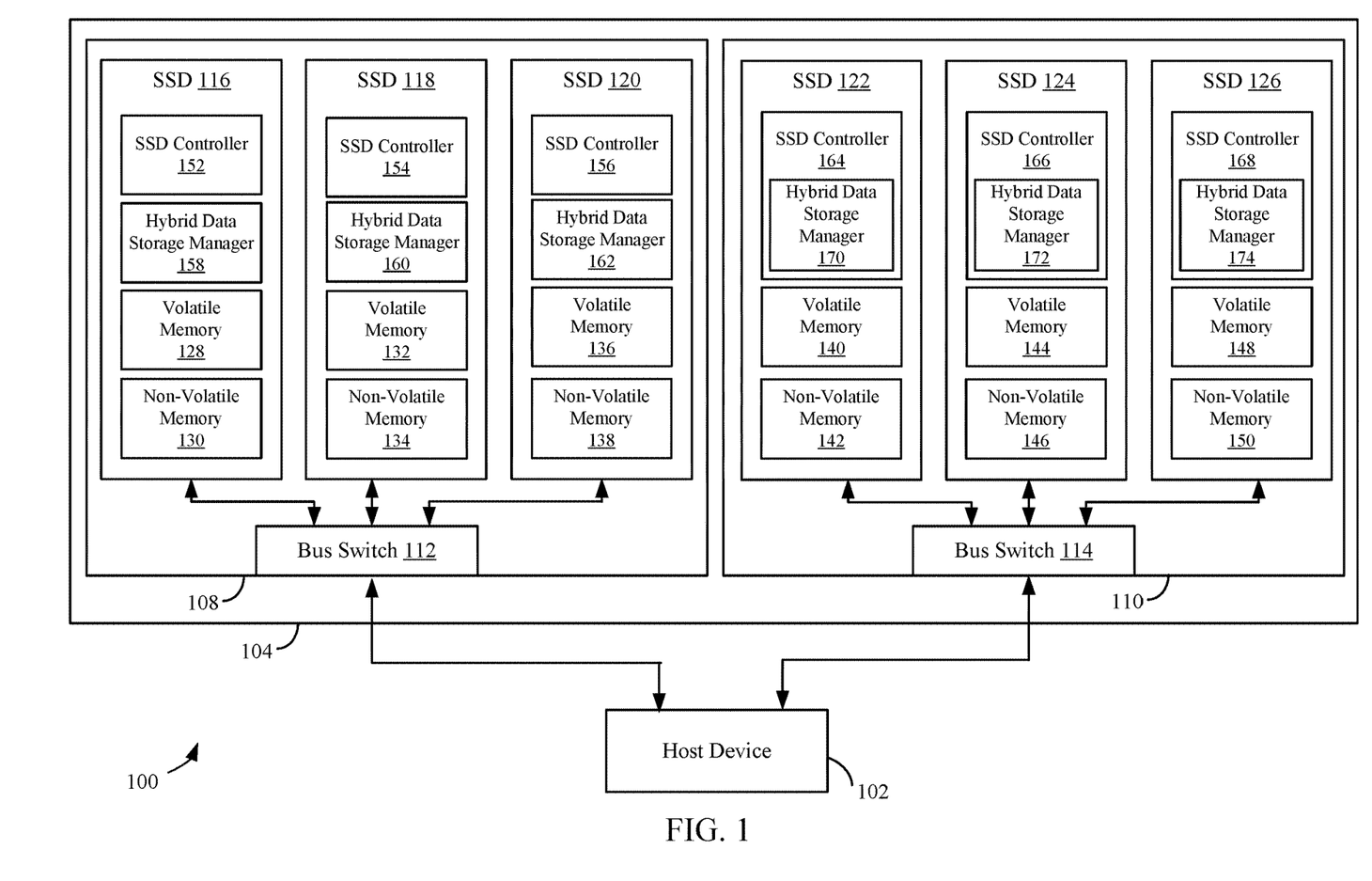
FIG. 1 is a block diagram of a server configured for storing data, according to an example embodiment.

Hybrid SSDs may be implemented in various manners, in embodiments. For instance, FIG. 1 is a block diagram of a storage server 100 ("server 100" herein) configured for storing data, according to an example embodiment. In embodiments, server 100 may be a standalone server or a server within a server rack, server cluster, or datacenter. Server 100 may be connected to other computing devices via wired and/or wireless connections, not shown in FIG. 1 for illustrative simplicity and brevity. For instance, server 100 may be accessed by computing devices via a network such as a local area network (LAN), wide area network (WAN), enterprise network, the Internet, etc. As shown in FIG. 1, server 100 includes a host device 102 and storage 104. As illustrated in FIG. 1, storage 104 includes drive sets 108 and 110. Drive set 108 includes a bus switch 112 and first-third hybrid SSDs 116, 118, and 120. Drive set 110 includes a bus switch 114 and first-third hybrid SSDs 122, 124, and 126. Host device 102 is configured to manage and access data stored in storage 104. For example, host device 102 may provide access to data stored in storage 104 to a computing device. For instance, host device 102 may send read or write requests to drive set 108 or drive set 110. Bus switches 112 and 114 are configured to send read or write requests received from host device 102 to their respective hybrid SSDs. In an embodiment, host device 102 includes an interface for directly accessing and managing data stored in storage 104. Storage 104 is a storage region of server 100 that may be accessed via a wired and/or wireless network and managed by host device 102.

Each of hybrid SSDs 116, 118, 120, 122, 124, and 126 may be configured to store data in a volatile memory storage space and a non-volatile memory storage space. As illustrated in FIG. 1, hybrid SSDs 116, 118, 120, 122, 124, and 126 each include a respective one of SSD volatile memory storage spaces 128, 132, 136, 140, 144, and 148, a respective one of non-volatile memory storage spaces 130, 134, 138, 142, 146, and 150, a respective one of SSD controllers 152, 154, 156, 164, 166, and 168, and a respective one of hybrid data storage managers 158, 160, 162, 170, 172, and 174. As illustrated in FIG. 1, hybrid data storage managers 158, 160, and 162 are components of respective hybrid SSDs 116, 118, and 120, and hybrid data storage managers 170, 172, and 174 are integrated in respective SSD controllers 164, 166, and 168. Volatile memory storage spaces 128, 132, 136, 140, 144, and 148 are configured to store respective address mapping tables in respective first memory regions. Each of volatile memory storage spaces 128, 132, 136, 140, 144, and 148 may include an unused portion of volatile memory storage space. These unused portions of volatile memory storage spaces may be configured as respective second memory regions. Hybrid data storage managers 158, 160, 162, 170, 172, and 174 are each configured to manage requests to read data from and/or write data to second memory regions of the respective one of volatile memory storage spaces 128, 132, 136, 140, 144, 148 and/or respective one of physical addresses of non-volatile memory storage spaces 130, 134, 138, 142, 146, and 150.

Server 100 may include additional components and/or subcomponents not shown in FIG. 1 for illustrative simplicity and brevity. For instance, while only two drive sets are shown in FIG. 1, it is contemplated herein that host devices, such as host device 102, may manage and access data stored in any number of drive sets (e.g., less than ten, in the tens, in the hundreds, or in even greater numbers). Furthermore, while each drive set is illustrated as a set of three hybrid SSDs, it is contemplated herein that drive sets may include any number of hybrid SSDs (e.g., less than ten, in the tens, in the hundreds, or in even greater numbers). Moreover, a drive set may include storage devices other than hybrid SSDs, including hard disk drives (HDDs), conventional SSDs, and/or the like. As illustrated in FIG. 1, hybrid data storage managers 158, 160, and 162 are separate components of respective hybrid SSDs 116, 118, and 120, however it is contemplated herein that hybrid data storage managers may be implemented as a sub-component of an SSD controller (e.g., as illustrated and described with respect to hybrid SSDs 122, 124, and 126), a sub-component of a memory device (e.g., a volatile memory device or a non-volatile memory device), and/or another component of a hybrid SSD, depending on the particular implementation.

Figure 2:
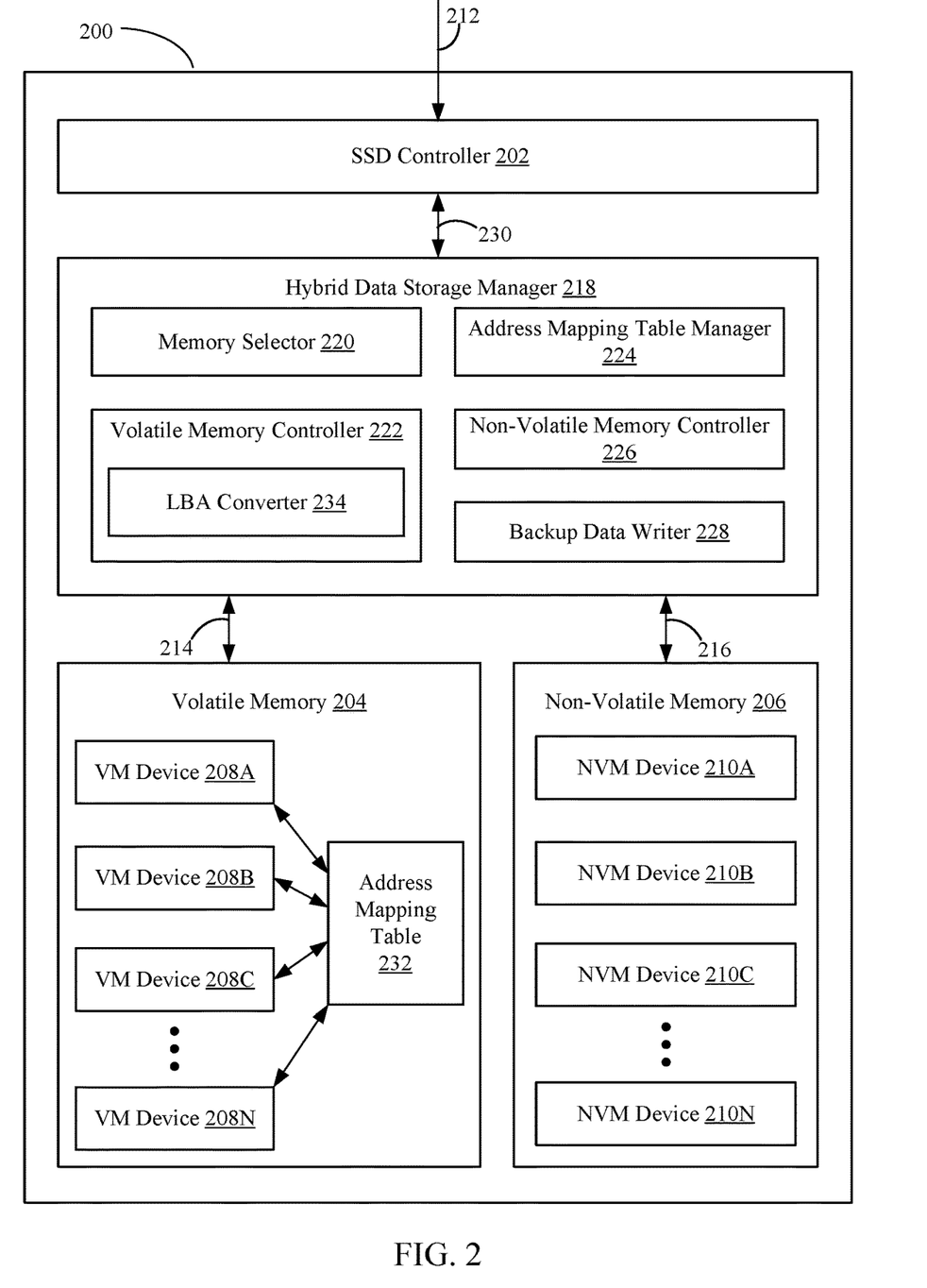
FIG. 2 is a block diagram of a hybrid solid-state drive, according to an example embodiment.

Embodiments of hybrid SSDs, such as hybrid SSDs 116, 118, 120, 122, 124, and 126 of server 100 as illustrated in FIG. 1, may be configured in various ways. For instance, FIG. 2 is a block diagram of a hybrid SSD 200, according to an example embodiment. Hybrid SSD 200 may be a further embodiment of one or more of hybrid SSD 116, 118, 120, 122, 124, or 126 of FIG. 1. Hybrid SSD 200 is described below with respect to server 100 of FIG. 1. Further structural and operational examples will be apparent to persons skilled in the relevant art(s) based on the following descriptions.

As illustrated in FIG. 2, hybrid SSD 200 includes an SSD controller 202, a hybrid data storage manager 218, a volatile memory storage space 204, and a non-volatile memory storage space 206. SSD controller 202 is configured to enable hybrid SSD 200 to communicate intra-system with components thereof, as well as with other devices and/or systems over a network, such as communications between hybrid SSD 200 and other devices, systems, and/or hosts, as described for system 100 in FIG. 1. For instance, SSD controller 202 may be communicatively coupled to host device 102 of FIG. 1 via communication link 212. SSD controller 202 may be directly coupled to host device 102 via communication link 212 or indirectly coupled (e.g., through a bus switch such as bus switch 112 or 114). SSD controller 202 may be communicatively coupled to hybrid data storage manager 218 via communication link 230. Hybrid data storage manager 218 may be communicatively coupled to volatile memory storage space 204 via communication link 214 and communicatively coupled to non-volatile memory storage space 206 via communication link 216. Communication links 212, 214, 216, and/or 230 may each comprise one or more physical (e.g., wires, cables, conductive traces, etc.) and/or wireless (e.g., radio frequency, infrared, etc.) communication connections, or any combination thereof. For example, in a circuit board embodiment, communication link 212 may be a cable connected to a communication interface of SSD controller 202 and communications links 214, 216, and 230 may be conductive traces on a circuit board that SSD controller 202, volatile memory storage space 204, non-volatile memory storage space 206, and hybrid data storage manager 218 are disposed on.

Volatile memory storage space 204 is configured to store volatile data. Volatile memory storage space 204 may include a first memory region and a second memory region. The first memory region is configured to store an address mapping table 232 and the second memory region is configured as an additional storage space. In accordance with an embodiment, the first memory region is further configured to store system data such as system variables. As illustrated in FIG. 2, volatile memory storage space 204 includes volatile memory devices 208A-208N ("volatile memory devices 208A-208N" herein), with volatile memory devices 208A, 208B, 208C, and 208N shown. Volatile memory devices 208A-208N may be any type of volatile memory devices, including DDR devices, SRAM devices, DRAM devices, and/or the like. Each of volatile memory devices 208A-208N may be the same or different type of volatile memory device. For instance, in accordance with an embodiment, each of volatile memory devices 208A-208N is a DDR device. Volatile memory devices 208A-208N may represent separate devices of a group of volatile memory devices. For instance, in a circuit board embodiment, each of volatile memory devices 208A-208N may be an integrated circuit chip disposed on the circuit board. In embodiments, the first and second storage regions may each be distributed across one or more of volatile memory devices 208A-208N. For instance, the second storage region may include a portion of the storage space of one of volatile memory devices 208A-208N, a portion of the storage space of a subset of volatile memory devices 208A-208N, and/or a portion of the storage space of each volatile memory devices 208A-208N. Each of volatile memory devices 208A-208N may have equal or different storage capacities. As illustrated in FIG. 2, address mapping table 232 is distributed across each of volatile memory devices 208A-208N, however it is contemplated herein that other implementations may store address mapping table 232 on a subset of volatile memory devices.

Non-volatile memory storage space 206 is configured to store non-volatile data. Physical addresses of non-volatile memory storage space 206 may be divided into one or more partitions. For instance, non-volatile memory storage space 206 may include one or more useable storage partitions, back-up storage partitions, and/or other partitions as would be understood by a person of skill in the relevant art(s) having the benefit of this disclosure. As illustrated in FIG. 2, non-volatile memory storage space 206 includes non-volatile memory devices 210A-210N ("non-volatile memory devices 210A-210N" herein), with non-volatile memory devices 210A, 210B, 210C, and 210N shown. Non-volatile memory devices 210A-210N may be any type of non-volatile memory devices, including flash memory storage devices (e.g., NAND flash, NOR flash, etc.), non-volatile random-access memory (NVRAM), and/or the like. Each of non-volatile memory devices 210A-210N may be the same or different type of non-volatile memory device. For instance, in accordance with an embodiment, each of non-volatile memory devices 210A-210N is a NAND flash device. Non-volatile memory devices 210A-210N may represent separate devices of a group of non-volatile memory devices. For instance, in a circuit board embodiment, each of non-volatile memory devices 210A-210N may be an integrated circuit chip disposed on the circuit board. Each of non-volatile memory devices 210A-210N may have equal or different storage capacities.

In accordance with an embodiment, SSD controller 202 is configured to manage communications received and sent via communication link 212 and communications to and from hybrid data storage manager 218 via communication link 230. For instance, SSD controller 202 may receive a read or write request from host device 102 of FIG. 1 via communication link 212 and transmit the request to hybrid data storage manager 218 via communication link 230. SSD controller 202 may include sub-components (not shown in FIG. 2 for brevity and illustrative clarity) configured to perform power management functions, fault monitoring, environmental monitoring, and other functions associated with the operation of hybrid SSD 200, as would be understood by a person of skill in the relevant art(s) having benefit of this disclosure.

Hybrid data storage manager 218 is configured to process read and write requests, manage data stored in volatile memory storage space 204 and non-volatile memory storage space 206, and access data stored in volatile memory storage space 204 and non-volatile memory storage space 206. Hybrid data storage manager 218 includes a memory selector 220, volatile memory controller 222, an address mapping table manager 224, non-volatile memory controller 226, and a backup data writer 228. Hybrid data storage manager 218 is configured to receive a request from SSD controller 202 via communication link 230.

Memory selector 220 is configured to determine which physical address is associated with the memory address of request signals received from SSD controller 202. For example, in accordance with an embodiment, if the received memory address corresponds to a physical address of the second memory region of volatile memory storage space 204, memory selector 220 selects volatile memory storage space 204. If the received memory address corresponds to a physical address of the non-volatile memory storage space 206, memory selector 220 selects non-volatile memory storage space 206. In accordance with an embodiment, the memory address is an LBA.

Volatile memory controller 222 is configured to read data from and write data to volatile memory storage space 204. For instance, when hybrid SSD 200 is turned on or otherwise powered up, volatile memory controller 222 receives an address mapping table (e.g., a backup address mapping table stored in non-volatile memory storage space 206) and writes the received address mapping table to the first memory region of volatile memory storage space 204 as address mapping table 232. Volatile memory controller 222 is further configured to receive requests to read data from and write data to the second memory region of volatile memory storage space 204. For instance, if memory selector 220 selects volatile memory storage space 204 based on a memory address received with a write request, volatile memory controller 222 writes the data included in the write request to the physical address of the second memory region based on the received memory address. If memory selector 220 selects volatile memory storage space 204 based on a memory address received with a read request, volatile memory controller 222 reads data from the physical address of the second memory region based on the received memory address. In accordance with an embodiment, volatile memory controller 222 is configured to transmit an acknowledgement after completing a read or write request. For instance, if the received request is a read request, volatile memory controller 222 is configured in accordance with an embodiment to transmit the data read from the second memory region of volatile memory storage space 204 to SSD controller 202 via communication link 230, which in turn is configured to transmit the data to host device 102 via communication link 212. If the received request is a write request, volatile memory controller 222 is configured in accordance with an embodiment to transmit a write complete acknowledgement to SSD controller 202 via communication link 230, which in turn is configured to transmit the write complete acknowledgment to host device 102 via communication link 212.

Volatile memory controller 222 may be configured to determine a physical address in various ways. For instance, as illustrated in FIG. 2, volatile memory controller 222 includes an LBA converter 234. LBA converter 234 is configured to convert the memory address of a request signal received by hybrid data storage manager 218 to a physical address of volatile memory storage space 204 if memory selector 220 selects volatile memory storage space 204. In accordance with an embodiment, the received memory address is an LBA. In this context, LBA converter 234 converts the received LBA to a corresponding physical address of the second memory region according to Equation 1 as follows:

$$PA = S + (y-x) * Size_{LBA} \qquad \text{(Equation 1)}$$

In Equation 1, PA is the physical address, S is the starting physical address of the second memory region of volatile memory storage space 204, y is the received LBA, x is the number of the first LBA stored in volatile memory storage space 204, and $Size_{LBA}$ is the size of each LBA in bytes. In a non-limiting example, if the first LBA is stored in physical address 0xEE6B_2800, x is 0 (e.g., the first LBA stored in physical address 0xEE6B_2800 is LBA0), y is 10 (e.g., the received LBA is LBA10), and each LBA is 4,096 bytes, LBA converter 234 converts the received LBA (LBA10) to the physical address 0xEE6B_C800.

Address mapping table manager 224 is configured to determine a physical address of non-volatile memory storage space 206 corresponding to the received memory address based on address mapping table 232. For instance, if memory selector 220 selects non-volatile memory storage space 206 based on the received memory address, address mapping table manager 224 is configured to access address mapping table 232 from volatile memory storage space 204 to determine a physical address of non-volatile memory storage space 206 corresponding to the received memory address. Address mapping table manager 224 may be configured to access address mapping table 232 via communication link 114, or indirectly via volatile memory controller 222. In accordance with an embodiment, address mapping table manager 224 is configured to determine whether or not the received memory address corresponds to a previously mapped physical address based on address mapping table 232. If the received memory address corresponds to a previously mapped physical address, address mapping table manager 224 indicates the physical address of non-volatile memory storage space 206 corresponding to the received memory address. If the received memory address does not correspond to a previous mapped physical address, address mapping table manager 224 allocates a new physical address from available physical address to correspond with the received memory address. In this context, address mapping table manager 224 updates address mapping table 232 to indicate the physical address corresponding to the received memory address.

Non-volatile memory controller 226 is configured to write data to and read data from non-volatile memory storage space 206. Non-volatile memory controller 226 is configured to receive the indication from address mapping table manager 224 indicating the physical address that corresponds to the received memory address. In this context, non-volatile memory controller 226 writes data to and/or reads data from the indicated physical address of non-volatile memory storage space 206. In accordance with an embodiment, non-volatile memory controller 226 is configured to transmit an acknowledgement after completing a read or write request. For instance, if the received request is a read request, non-volatile memory controller 226 is configured in accordance with an embodiment to transmit the data read from non-volatile memory storage space 206 to SSD controller 202 via communication link 230, which in turn is configured to transmit the data to host device 102 via communication link 212. If the received request is a write request, non-volatile memory controller 226 is configured in accordance with an embodiment to transmit a write complete acknowledgement to SSD controller 202 via communication link 230, which in turn is configured to transmit the write complete acknowledgment to host device 102 via communication link 212.

Backup data writer 228 is configured to manage a backup operation of hybrid data storage manager 218. For instance, in response to a power down event, backup data writer 228 is configured to write data stored in the second memory region of volatile memory storage space 204 to non-volatile memory storage space 206. In some embodiments, backup data writer 228 is configured to restore data previously stored in the second memory region of volatile memory storage space 204 in response to a power up event. In accordance with an embodiment, hybrid SSD 200, or a system implementing hybrid SSD 200, includes a backup power circuit (not shown in FIG. 2 for brevity and illustrative clarity). In this context, the backup power circuit is configured to provide enough power to hybrid SSD 200 so that backup data writer may perform a backup operation in response to a power down event. For instance, if the second memory region utilizes 200 MB and the write bandwidth of hybrid SSD 200 is 1 GB/s, the data stored in the second memory region may be flushed to non-volatile memory storage space 206 in less than 1 second. In this context, the backup power circuit is configured to power hybrid SSD 200 for at least 1 second. Servers, such as server 100 of FIG. 1, implementing a backup power circuit and backup data writer 228 may be configured to treat data stored in the second memory region of volatile memory storage space 204 as non-volatile data.

Hybrid SSD 200 may be implemented in various ways. For instance, hybrid SSD 200 may include a circuit board. In this context, SSD controller 202, hybrid data storage manager 218, volatile memory devices 208A-208N, and non-volatile memory devices 210A-210N may be integrated circuits mounted to the circuit board. One or more of SSD controller 202, hybrid data storage manager 218, volatile memory devices 208A-208N, and/or non-volatile memory devices 210A-210N may be included in the same integrated circuit package. In accordance with an embodiment, SSD controller 202, hybrid data storage manager 218, volatile memory devices 208A-208N, and/or non-volatile memory devices 210A-210N are implemented in a module (e.g., a "system-on-chip" (SOC)). In this context, SSD controller 202, hybrid data storage manager 218, volatile memory devices 208A-208N, and/or non-volatile memory devices 210A-210N may be mounted to separate circuit boards and/or packaged within a sub-module. One or more of SSD controller 202, hybrid data storage manager 218, volatile memory devices 208A-208N, and/or non-volatile memory devices 210A-210N may be disposed on the same circuit board and/or packaged within the same sub-module. As illustrated in FIG. 2, hybrid data storage manager 218 is a separate component of hybrid SSD 200, however, it is contemplated herein that hybrid data storage manager 218 may be implemented as a subcomponent of another component of hybrid SSD 200. For instance, hybrid data storage manager 218 in accordance with an embodiment is implemented as a subcomponent of SSD controller 202. In accordance with another embodiment, one or more sub-components of hybrid data storage manager 218 are implemented as a set of programming instructions that are executed by a processor of hybrid SSD 200. In this context, the set of programming instructions may be stored in one or more memories of hybrid SSD 200, SSD controller 202, and/or hybrid data storage manager 218, in volatile memory storage space 204, and/or in non-volatile memory storage space 206.

Hybrid SSD 200 may include additional components and/or subcomponents not shown in FIG. 2 for illustrative simplicity and brevity. For instance, hybrid SSD 200 may include one or more communication interfaces, processors, additional memory devices, and/or sub-controllers.

Figure 3A:
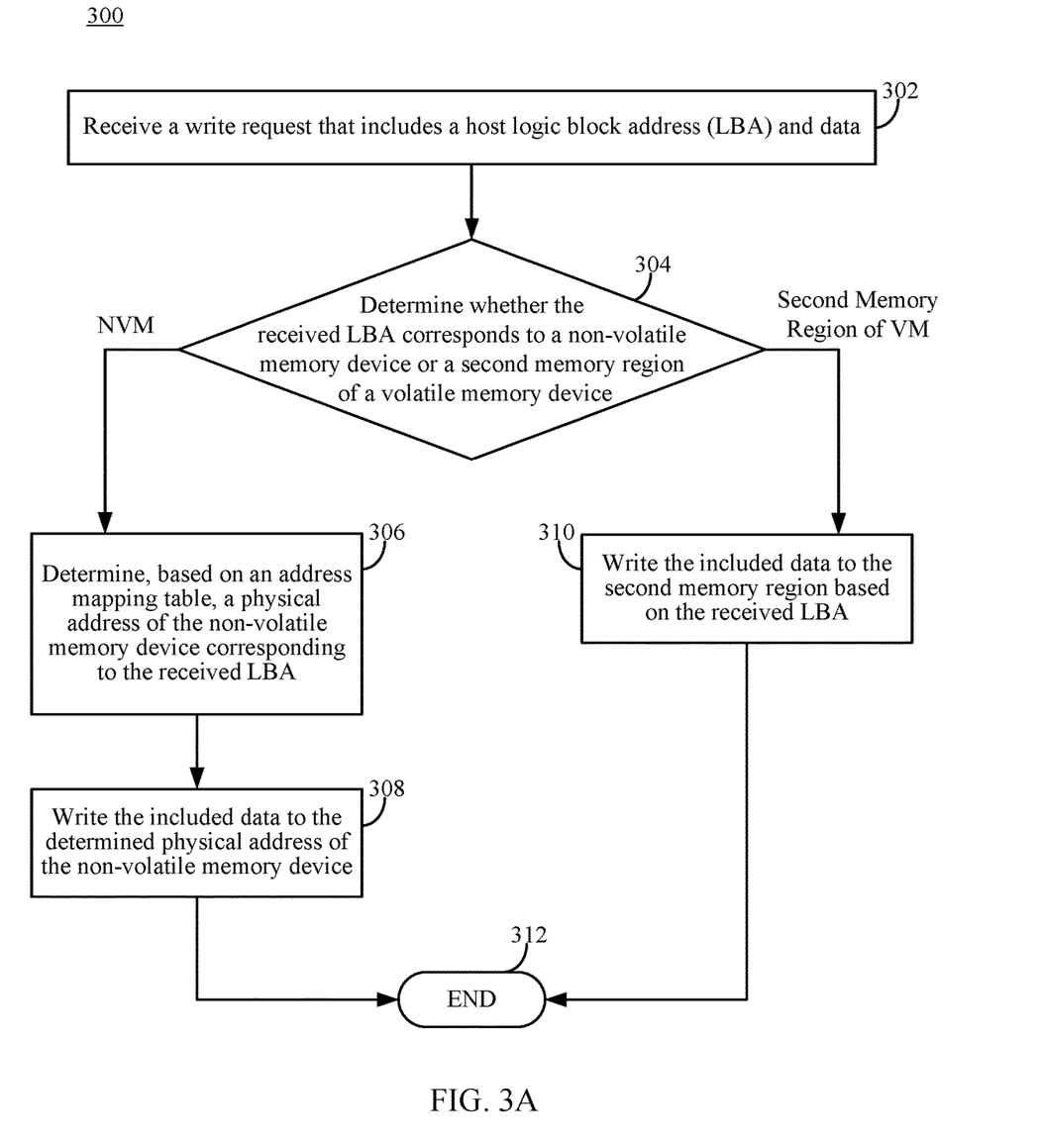
FIG. 3A is a flowchart of a process for writing data to a hybrid solid-state drive, according to an embodiment.

Note that hybrid data storage manager 218 as illustrated in FIG. 2 may operate in various ways, in embodiments. For example, hybrid data storage manager 218 may be configured to process write requests from a host device, such as host device 102 of server 100 in FIG. 1. For instance, FIG. 3A is a flowchart 300 of a process for writing data to a hybrid solid-state drive, according to an embodiment. In an embodiment, hybrid data storage manager 218 may be configured to perform one or all of the steps of flowchart 300. Flowchart 300 is described as follows with respect to server 100 of FIG. 1 and hybrid SSD 200 of FIG. 2. Further structural and operational embodiments will be apparent to persons skilled in the relevant art(s) based on the following description. Note that not all steps of flowchart 300 need to be performed in all embodiments.

Flowchart 300 starts with step 302. In step 302, a write request that includes a host LBA and data is received. For instance, SSD controller 202 of FIG. 2 receives a write request that includes a host LBA and data from host device 102 of FIG. 1 via communication link 212. Furthermore, hybrid data storage manager 218 is configured to receive the write request from SSD controller 202 via communication link 230.

In step 304, a determination of whether the received LBA corresponds to a non-volatile memory device or a second memory region of a volatile memory device is made. For instance, memory selector 220 of FIG. 2 determines whether the LBA received in step 302 corresponds to one of non-volatile memory devices 210A-210N or a second memory region of one of volatile memory devices 208A-208N. If the received LBA corresponds to one of non-volatile memory devices 210A-210N, flowchart 300 proceeds to step 306. If the received LBA corresponds to one of volatile memory devices 208A-208N, flowchart 300 proceeds to step 310.

In step 306, a physical address of the non-volatile memory device corresponding to the received LBA is determined based on an address mapping table. For instance, address mapping table manager 224 of FIG. 2 accesses address mapping table 232 stored in the first memory region of volatile memory storage space 204. Address mapping table manager 224 may access address mapping table 232 directly via communication link 214 or indirectly (e.g., via volatile memory controller 222). Address mapping table manager 224 determines a physical address of non-volatile memory storage space 206 corresponding to the received LBA based on address mapping table 232.

In step 308, the included data is written to the determined physical address of the non-volatile memory device. For instance, non-volatile memory controller 226 of FIG. 2 writes the included data received in step 302 to the physical address of non-volatile memory storage space 206 determined in step 306.

In step 310, the included data is written to the second memory region based on the received LBA. For instance, SSD controller 202 of FIG. 2 writes the included data received in step 302 to the second memory region of volatile memory storage space 204 based on the LBA received in step 302. In accordance with an embodiment, SSD controller 202 writes the included data to the second memory region of volatile memory storage space 204 via a direct write operation. After the write is completed, flowchart 300 proceeds to step 312.

In step 312, flowchart 300 ends. In embodiments, hybrid data storage manager 218 may be configured to transmit a write complete acknowledgement as part of step 312. For instance, in accordance with an embodiment, hybrid data storage manager 218 transmits a write complete acknowledgement to SSD controller 202 via communication link 230, which in turn transmits the write complete acknowledgement to host device 102 of FIG. 1 via communication link 212.

While flowchart 300 is described as a process for writing data to a hybrid SSD based on a write request including a single LBA, it is contemplated herein that a write request may include multiple LBAs. Hybrid SSD 200 may be configured to perform flowchart 300 for each received LBA sequentially or in batches of one or more received LBAs. Furthermore, the received LBAs may correspond to physical addresses of volatile memory storage space 204, physical addresses of non-volatile memory storage space 206, or a combination of physical address of volatile memory storage space 204 and non-volatile memory storage space 206. Moreover, it is contemplated herein that addressing schemes other than logical block addressing using LBAs may be used, as would be understood by a person of skill in the relevant art(s) having the benefit of this disclosure.

Figure 3B:
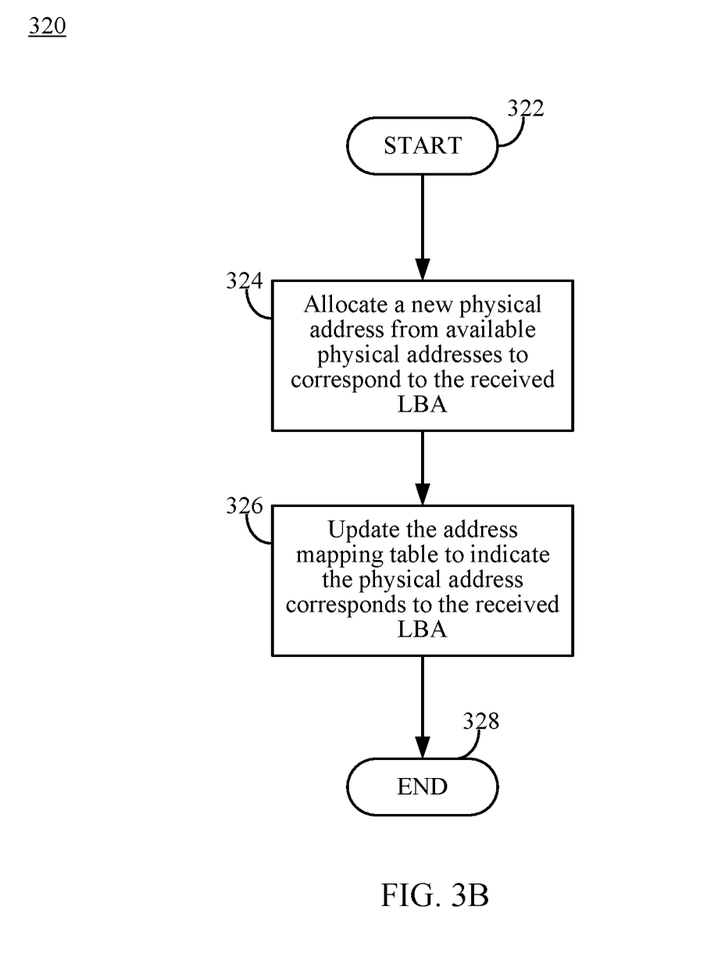
FIG. 3B is a flowchart of a process for determining a physical address of a non-volatile memory device corresponding to a received LBA, according to an embodiment.

Note that step 306 may be performed in various ways, in embodiments. For instance, FIG. 3B is a flowchart 320 of a process for determining a physical address of a non-volatile memory device corresponding to a received LBA, according to an embodiment. In an embodiment, flowchart 320 is an example process for step 306 of FIG. 3A, and hybrid SSD 200 may be configured to perform one or all of the steps of flowchart 320. Flowchart 320 is described as follows with respect to hybrid SSD 200 of FIG. 2. Further structural and operational embodiments will be apparent to persons skilled in the relevant art(s) based on the following description. Note that not all steps of flowchart 320 need to be performed in all embodiments.

Flowchart 320 starts with step 322. In accordance with an embodiment, step 322 is step 304 of flowchart 300 of FIG. 3A, wherein the received LBA is determined to correspond to a non-volatile memory device (e.g., one of non-volatile memory devices 210A-210N of FIG. 2). In accordance with another embodiment, step 322 is an intermediary step between steps 304 and 306. In accordance with yet another embodiment, step 322 is a sub-step of step 306 preceding step 324.

In step 324, a new physical address is allocated from available physical address to correspond to the received LBA. For instance, address mapping table manager 224 of FIG. 2 allocates a new physical address of non-volatile memory storage space 206 to correspond to the received LBA. The new physical address is an unused available physical address or a reserved physical address. For instance, if a number of physical addresses of non-volatile memory storage space 206 become corrupted or otherwise unsuitable for storing data, SSD controller 202 may convert reserved physical addresses to available physical addresses.

In step 326, the address mapping table is updated to indicate the physical address corresponding to the received LBA. For instance, address mapping table manager 224 of FIG. 2 updates address mapping table 232 to indicate the physical address of non-volatile memory storage space allocated in step 324. Step 326 may be performed before or after step 308 of flowchart 300, depending on the particular implementation. After address mapping table 232 is updated, flowchart 320 proceeds to step 328.

Flowchart 320 ends with step 328. In accordance with an embodiment, step 328 is step 308 of flowchart 300 in FIG. 3A. In accordance with another embodiment, step 328 is step 312 of flowchart 300. In accordance with yet another embodiment, step 328 is an intermediary step between step 326 and either steps 308 or 312.

It is contemplated herein that SSD controller 202 may re-allocate a previously allocated physical address of non-volatile memory storage space 206 as part of performing step 324. For instance, if address mapping table manager 224 or another component or sub-component of hybrid SSD 200 determines the previously allocated physical address is corrupted or otherwise no longer suitable for storing data, address mapping table manager 224 may allocate a new physical address from available physical addresses to correspond to the received LBA.

Figure 3C:
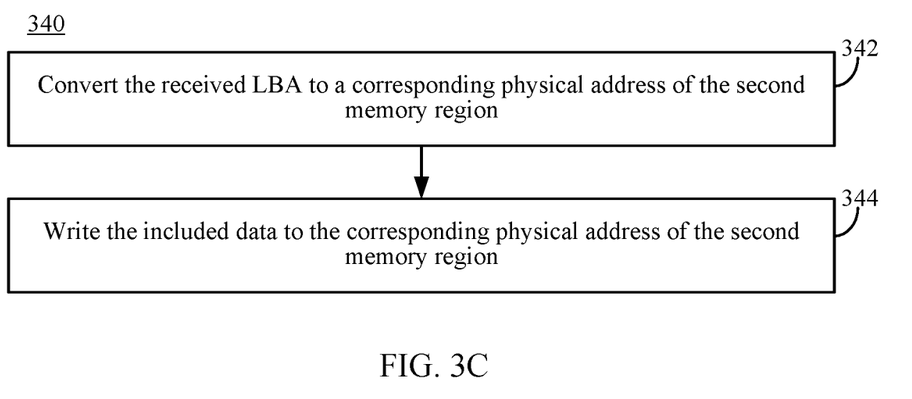
FIG. 3C is a flowchart of a process for writing data to a second memory region of a volatile memory device based on a received LBA, according to an embodiment.

Note that step 310 may be performed in various ways, in embodiments. For instance, FIG. 3C is a flowchart 340 of a process for writing data to a second memory region of a volatile memory device based on a received LBA, according to an embodiment. In an embodiment, flowchart 340 is an example process for step 310 of FIG. 3A, and hybrid SSD 200 may be configured to perform one or all of the steps of flowchart 340. Flowchart 340 is described as follows with respect to hybrid SSD 200 of FIG. 2. Further structural and operational embodiments will be apparent to persons skilled in the relevant art(s) based on the following description. Note that not all steps of flowchart 340 need to be performed in all embodiments.

Flowchart 340 starts with step 342. In step 342, the received LBA is converted to a corresponding physical address of the second memory region. For instance, LBA converter 234 of FIG. 2 converts the received LBA to a corresponding physical address of the second memory region of volatile memory storage space 204. The received LBA may be converted to the corresponding physical address in a variety of ways. For instance, in accordance with an embodiment, LBA converter 234 of FIG. 2 converts the received LBA to a corresponding physical address of the second memory region according to Equation 1 as described with respect to FIG. 2 above.

In step 344, the included data is written to the corresponding physical address of the second memory region. For instance, volatile memory controller 222 of FIG. 2 writes the included data to the corresponding physical address of the second memory region of volatile memory storage space 304.

Figure 4:
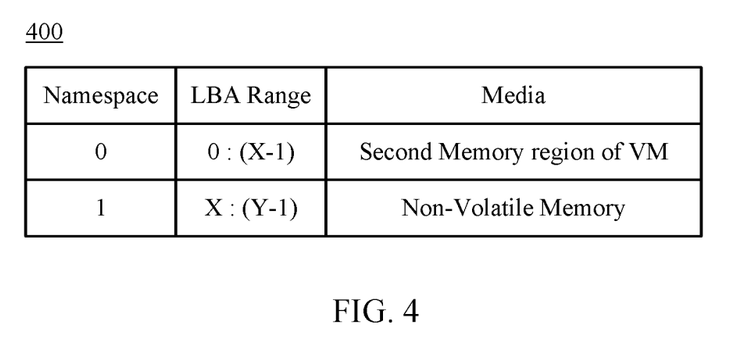
FIG. 4 is an example namespace table, according to an embodiment.

Note that memory addresses such as LBAs may be defined in various ways, in embodiments. For instance, FIG. 4 is an example namespace table 400, according to an embodiment. Namespace table 400 may be used to understand how hybrid SSD 200 of FIG. 2 determines a physical address based on a received memory address. Further structural and operational embodiments will be apparent to persons skilled in the relevant art(s) based on the following description. FIG. 4 is described as follows with respect to server 100 of FIG. 1 and hybrid SSD 200 of FIG. 2.

As illustrated in FIG. 4, namespace table 400 includes a namespace "0" and a namespace "1". Namespace table 400 is configured to utilize Y LBAs. Namespace 0 corresponds to the second memory region of the volatile memory storage space and includes LBAs 0 through X-1. Namespace 1 corresponds the non-volatile memory storage space and includes LBAs X through LBA Y-1. Namespaces may be used in a variety of ways. For instance, namespaces may be displayed in an interface of a computing device so that a user may configure data traffic to utilize a particular namespace. For example, a user may select namespace 0 for lower latency storage or select namespace 1 for higher storage capacity. In some embodiments, hybrid data storage manager 218 may be configured to direct data traffic to a particular namespace based on an application. For instance, in a key-value data store application, hybrid data storage manager 218 is configured to store log files in namespace 0. In a journal file system application, hybrid data storage manager 218 is configured to store journals in namespace 0. In these example applications, the quality of service may be increased, and the write amplification may be reduced.

While namespace table 400 illustrates separate namespaces for the second memory region of the volatile memory storage space and the non-volatile memory storage space, it is contemplated herein that each region of storage space may be a range of LBAs within the same namespace. Furthermore, it is contemplated herein that the second memory region of the volatile memory storage space and/or the non-volatile memory storage space may be partitioned into additional namespaces. While LBA range 0 to X-1 are associated with the second memory region and LBA range X to Y-1 are associated with the non-volatile memory storage space in FIG. 4, it is contemplated herein that LBA ranges may be ordered in other ways, depending on the particular implementation. For instance, in accordance with an embodiment, LBA range 0 to X-1 corresponds to the non-volatile memory storage space and LBA range X to Y-1 corresponds to the volatile memory storage space.

As described herein, the second memory region of volatile memory storage space is volatile memory. In accordance with an embodiment, data stored in the second memory region may be treated as non-volatile data by flushing data stored in the second memory region to the non-volatile memory storage space during a re-boot or power-down cycle.

Figure 5:
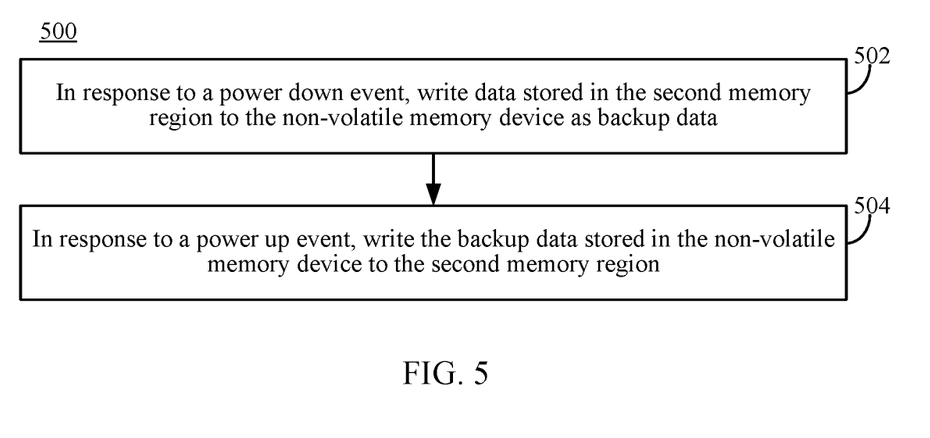
FIG. 5 is a flowchart of a process for backing up data stored in and restoring data to a second memory region of a volatile memory device, according to an embodiment.

Embodiments of hybrid SSDs may be configured to backup and restore data stored in the second memory region of the volatile memory storage space in various ways. For instance, FIG. 5 is a flowchart 500 of a process for backing up data stored in and restoring data to a second memory region of a volatile memory device, according to an embodiment. In an embodiment, hybrid SSD 200 of FIG. 2 may be configured to perform one or all of the steps of flowchart 500. Flowchart 500 is described as follows with respect to system 100 and hybrid SSD 200 of FIG. 2. Further structural and operational embodiments will be apparent to persons skilled in the relevant art(s) based on the following description. Note that not all steps of flowchart 500 need to be performed in all embodiments.

Flowchart 500 starts with step 502. In step 502, data stored in the second memory region is written to the non-volatile memory device as backup data in response to a power down event. For instance, backup data writer 228 of FIG. 2 writes data stored in the second memory region of volatile memory storage space 204 to non-volatile memory storage space 206 as backup data in response to a power down event. Backup data writer 228 may access data stored in the second memory region of volatile memory storage space 204 directly via communication link 214 or indirectly (e.g., via volatile memory controller 222). The backup data may be written to non-volatile memory storage space 206 via an operation similar to that described with respect steps 306 and 308 of flowchart 300 as illustrated and described with respect to FIG. 3A. In accordance with an embodiment, a portion of non-volatile memory storage space 206 is reserved for storing backup data. A power down event may include a power down cycle, a system reboot, a power failure, and/or any other situation where power is removed from hybrid SSD 200. In accordance with an embodiment, SSD controller 202 may queue the backup operation of step 502 as part of a power down cycle or system reboot. In a scenario where power is lost unexpectedly, immediately, or otherwise (e.g., due to a forced reset, a forced shutdown, or a power failure), hybrid SSD 200, server 100 of FIG. 1, or a datacenter implementing hybrid SSD 200 may include a backup power circuit allowing backup data writer 228 to flush data stored in the second memory region of volatile memory storage space 204 to non-volatile memory storage space 206. For instance, if the second memory region utilizes 200 MB and the write bandwidth of hybrid SSD 200 is 1 GB/s, the data stored in the second memory region may be flushed to non-volatile memory storage space 206 in less than 1 second.

In step 504, the backup data stored in the non-volatile memory device is written to the second memory region in response to a power up event. For instance, backup data writer 228 of FIG. 2 writes the backup data stored in non-volatile memory storage space 206 to the second memory region of volatile memory storage space 204 in response to a power up event. Backup data writer 228 may access data stored in non-volatile memory storage space 206 directly via communication link 216 or indirectly (e.g., via non-volatile memory controller 226). The backup data may be written to the second memory region of volatile memory storage space 204 via an operation similar to that described with respect step 310 of flowchart 300 as illustrated and described with respect to FIG. 3A. A power up event may include power being restored to hybrid SSD 200 following a power outage or power failure, the end of a system reboot, turning on a power supply of hybrid SSD 200, and/or otherwise providing power to hybrid SSD 200.

Figure 6:
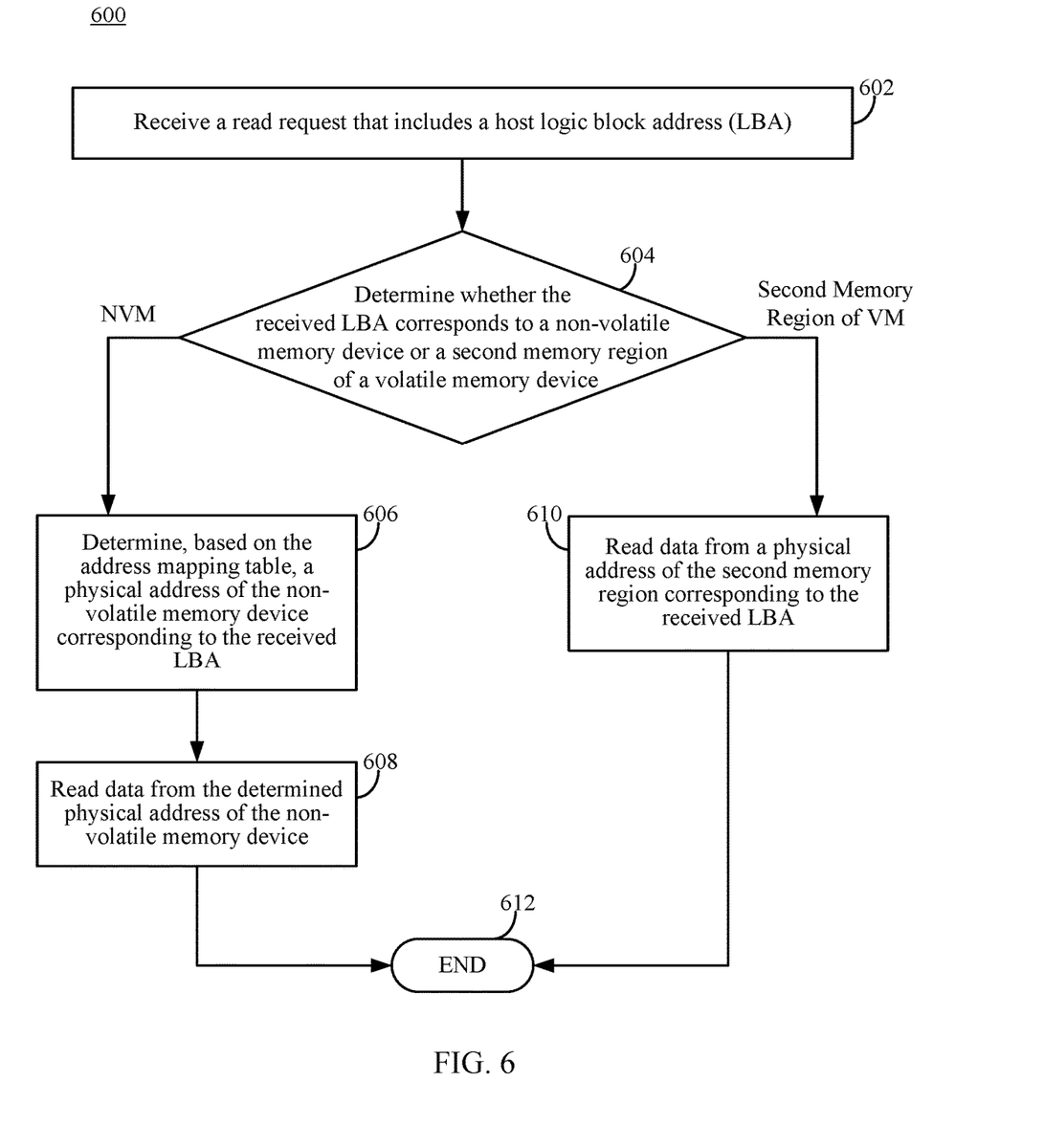
FIG. 6 is a flowchart of a process for reading data stored in a hybrid solid-state drive, according to an embodiment.

Hybrid SSD 200 may be configured to process read requests from a host device, such as host device 102 of server 100 in FIG. 1. For instance, FIG. 6 is a flowchart of a process for reading data stored in a hybrid solid-state drive, according to an embodiment. In an embodiment, hybrid SSD 200 may be configured to perform one or all of the steps of flowchart 600. Flowchart 600 is described as follows with respect to server 100 of FIG. 1 and hybrid SSD 200 of FIG. 2. Further structural and operational embodiments will be apparent to persons skilled in the relevant art(s) based on the following description. Note that not all steps of flowchart 600 need to be performed in all embodiments.

Flowchart 600 starts with step 602. In step 602, a read request that includes a host LBA is received. For instance, SSD controller 202 of FIG. 2 receives a read request from host device 102 via communication link 212. Furthermore, hybrid data storage manager 218 receives the read request from SSD controller 202 via communication link 230.

In step 604, a determination of whether the received LBA corresponds to a non-volatile memory device or a second memory region of a volatile memory device is made. For instance, memory selector 220 of FIG. 2 determines whether the LBA received in step 602 corresponds to non-volatile memory storage space 206 or the second memory region of volatile memory storage space 204. If the received LBA corresponds to non-volatile memory storage space 206, flowchart 600 proceeds to step 606. If the received LBA corresponds to the second memory region of volatile memory storage space 204, flowchart 600 proceeds to step 610.

In step 606, a physical address of the non-volatile memory device corresponding to the received LBA is determined based on the address mapping table. For instance, address mapping table manager 224 of FIG. 2 accesses address mapping table 232 stored in the first memory region of volatile memory storage space 204 and determines a physical address of non-volatile memory storage space 206 corresponding to the LBA received in step 602 based on address mapping table 232.

In step 608, data is read from the determined physical address of the non-volatile memory device. For instance, non-volatile memory controller 226 of FIG. 2 reads data from the physical address of non-volatile memory storage space 206 determined in step 606, and flowchart 600 proceeds to step 612.

In step 610, data is read from a physical address of the second memory region corresponding to the received LBA. For instance, volatile memory controller 222 of FIG. 2 reads data from a physical address of the second memory region of volatile memory storage space 204 corresponding to the LBA received in step 602, and flowchart 600 proceeds to step 612. In accordance with an embodiment, the physical address of the second memory region may be determined based on Equation 1, as described with respect to FIG. 2 above. In accordance with an embodiment, volatile memory controller 222 reads data from the physical address of the second memory region of volatile memory storage space 204 corresponding to the LBA received in step 602 via a direct read operation.

Flowchart 600 ends in step 612. In step 612, data read in step 608 or step 610 is transmitted to a requesting device. For instance, hybrid data storage manager 218 of FIG. 2 transmits data read in step 608 or step 610 to SSD controller 202 via communication 230, which in turn transmits the data to host device 102 of FIG. 1 via communication link 212.

III. Further Example Embodiments and Advantages

As noted above, systems and devices, including datacenters, servers, and hybrid SSDs, may be configured in ways to store data in a second memory region of a volatile memory storage space. Hybrid SSDs have been described with respect to datacenters and host devices of servers, however, it is also contemplated herein that hybrid SSDs may be used in other applications such as a computing device. Volatile memory storage spaces have been described as having a first memory region and a second memory region, however it is contemplated herein that volatile memory storage space may have additional memory regions for functions as would be understood by persons of skill in the relevant art(s) having the benefit of this disclosure. For instance, an additional memory region of a volatile memory storage space may be used to store system variables.

Moreover, according to the described embodiments and techniques, any components of datacenters, servers, host devices, bus switches, hybrid SSDs, SSD controllers, and/or hybrid data storage managers and their functions may be caused to be activated for operation/performance thereof based on other operations, functions, actions, and/or the like, including initialization, completion, and/or performance of the, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The further example embodiments and advantages described in this Section may be applicable to any embodiments disclosed in this Section or in any other Section of this disclosure.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

IV. Example Processor-based Implementations

SSD controllers 152, 154, 156, 164, 166, and 168, hybrid data storage managers 158, 160, 162, 170, 172, and 174, SSD controller 202, hybrid data storage manager 218, memory selector 220, volatile memory controller 222, address mapping table manager 224, non-volatile memory controller 226, backup data writer 228, LBA converter 234, flowchart 300, flowchart 320, flowchart 340, flowchart 500, and/or flowchart 600 may be implemented in hardware, or hardware with any combination of software and/or firmware, including being implemented as computer program code configured to be executed in one or more processor units and stored in a computer readable storage medium, or being implemented as hardware logic/electrical circuitry, such as being implemented in a system-on-chip (SoC). The SoC may include an integrated circuit chip that includes one or more of a processor unit (e.g., a microcontroller, microprocessor, digital signal processor (DSP), etc.), memory, one or more communication interfaces, and/or further circuits and/or embedded firmware to perform its functions.

A processor unit is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. A processor unit may execute program code stored in a computer readable medium, such as program code embodiments of SSD controllers 152, 154, 156, 164, 166, and 168, hybrid data storage managers 158, 160, 162, 170, 172, and 174, SSD controller 202, hybrid data storage manager 218, memory selector 220, volatile memory controller 222, address mapping table manager 224, non-volatile memory controller 226, backup data writer 228, LBA converter 234, flowchart 300, flowchart 320, flowchart 340, flowchart 500, and/or flowchart 600. Note that any suitable storage, including memory, may be used to store SSD controllers 152, 154, 156, 164, 166, and 168, hybrid data storage managers 158, 160, 162, 170, 172, and 174, SSD controller 202, hybrid data storage manager 218, memory selector 220, volatile memory controller 222, address mapping table manager 224, non-volatile memory controller 226, backup data writer 228, LBA converter 234. Examples of such storage include read only memory (ROM), random-access memory (RAM), a hard disk drive, a magnetic disk drive, or other physical storage device.

As used herein, the terms "computer program medium," "computer-readable medium," and "computer-readable storage medium" are used to refer to physical hardware media such as a hard disk, a removable magnetic disk, other physical hardware media such as RAMs, ROMs, flash memory cards, memory device packages, portable memory sticks, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

V Additional Exemplary Embodiments

In an embodiment, a solid-state drive (SSD) includes a circuit board, a non-volatile memory device mounted to the circuit board, a volatile memory device mounted to the circuit board, a controller mounted to the circuit board. The volatile memory device includes first and second memory regions. The first memory region is configured to store an address mapping table. The controller is communicatively coupled to the non-volatile memory device and the volatile memory device. The controller is configured to receive a write request that includes a host logic block address (LBA) and data. The controller is further configured to determine whether the received LBA corresponds to the non-volatile memory device or the second memory region. In response to the received LBA corresponding to the non-volatile memory device, the controller is configured to determine, based on the address mapping table, a physical address of the non-volatile memory device corresponding to the received LBA and write the included data to the physical address of the non-volatile memory device. In response to the LBA corresponding to the second memory region, the controller is configured to write the included data to the second memory region based on the LBA.

In an embodiment, the controller is configured to write the included data to the second memory region based on the received LBA by converting the received LBA to a corresponding physical address of the second memory region and writing the included data to the corresponding physical address of the second memory region.

In an embodiment, the controller is further configured to receive a read request that includes the LBA. The controller is further configured to determine whether the received LBA corresponds to the non-volatile memory device or the second memory region. In response to the received LBA corresponding to the non-volatile memory device, the controller is configured to determine, based on the address mapping table, the physical address of the non-volatile memory device corresponding to the received LBA and read data from the determined physical address of the non-volatile memory device. In response to the received LBA corresponding to the second memory region, the controller is configured to read data from a physical address of the second memory region corresponding to the received LBA.

In an embodiment, the controller is further configured to write data stored in the second memory region to the non-volatile memory device as backup data in response to a power down event.

In an embodiment, the controller is further configured to write the backup data stored in the non-volatile memory device to the second memory region in response to a power up event.

In an embodiment, the controller is configured to determine the physical address of the non-volatile memory device corresponding to the received LBA by allocating the physical address from available physical addresses to correspond to the received LBA and updating the address mapping table to indicate the physical address corresponds to the received LBA.

In an embodiment, the non-volatile memory device is a NAND flash memory device.

In an embodiment, the volatile memory device is a double data rate (DDR) memory device.

In an embodiment, a method for writing to a solid-state drive (SSD) is performed. The SSD includes a non-volatile memory device and a volatile memory device. The volatile memory device includes first and second memory regions. The first memory region storing an address mapping table. The method includes receiving a write request that includes a host logic block address LBA and data. A determination of whether the received LBA corresponds to the non-volatile memory device, or the second memory region is made. In response to the received LBA corresponding to the non-volatile memory device, a physical address of the non-volatile memory device corresponding to the received LBA is determined based on the address mapping table and the included data is written to the determined physical address of the non-volatile memory device. In response to the received LBA corresponding to the second memory region, the included data is written to the second memory region based on the received LBA.

In an embodiment, writing the included data to the second memory region based on the received LBA includes converting the received LBA to a corresponding physical address of the second memory region. The included data is written to the corresponding physical address of the second memory region.

In an embodiment, the method further includes writing data stored in the second memory region to the non-volatile memory device as backup data in response to a power down event.

In an embodiment, the method further includes writing the backup data stored in the non-volatile memory device to the second memory region in response to a power up event.

In an embodiment, the physical address of the non-volatile memory device corresponding to the received LBA is determined based on the address mapping table by allocating the physical address from available physical addresses to correspond to the received LBA. The address mapping table is updated to indicate the physical address corresponds to the received LBA.

In an embodiment, the non-volatile memory device is a NAND flash memory device.

In an embodiment, the volatile memory device is a double data rate (DDR) memory device.

In an embodiment, a solid-state drive (SSD) controller is configured to write to a non-volatile memory device and a volatile memory device. The volatile memory device includes a first and second memory regions. The first memory region is configured to store an address mapping table. The SSD controller is further configured to receive a write request that includes a host logic block address (LBA) and data. The SSD controller is further configured to determine whether the received LBA corresponds to the non-volatile memory device or the second memory region. The SSD controller is further configured to, in response to the received LBA corresponding to the non-volatile memory device, determine a physical address of the non-volatile memory device corresponding to the received LBA based on the address mapping table and write the included data to the determined physical address of the non-volatile memory device. The SSD controller is further configured to, in response to the received LBA corresponding to the second memory region, write the included data to the second memory region based on the received LBA.

In an embodiment, the SSD controller is further configured to write the included data to the second memory region based on the received LBA by converting the received LBA to a corresponding physical address of the second memory region and writing the included data to the corresponding physical address of the second memory region.

In an embodiment, the SSD controller is further configured to receive a read request that includes the LBA. The SSD controller is further configured to determine whether the received LBA corresponds to the non-volatile memory device or the second memory region. The SSD controller is further configured to, in response to the received LBA corresponding to the non-volatile memory device, determine based on the address mapping table, the physical address of the non-volatile memory device corresponding to the received LBA and reading data from the physical address of the non-volatile memory device. The SSD controller is further configured to, in response to the received LBA corresponding to the second memory region, read data from a physical address of the second memory region corresponding to the received LBA.

In an embodiment, the SSD controller is further configured to, in response to a power down event, write data stored in the second memory region to the non-volatile memory device as backup data.

In an embodiment, the SSD controller is further configured to, in response to a power up event, write the backup data stored in the non-volatile memory device to the second memory region.

VI. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments but should be defined only in accordance with the following claims and their equivalents.

What is claimed is:

1. A solid-state drive (SSD) comprising:
 a circuit board;
 a non-volatile memory device mounted to the circuit board;
 a volatile memory device mounted to the circuit board, the volatile memory device including first and second memory regions, the first memory region configured to store an address mapping table;
 a controller mounted to the circuit board and communicatively coupled to the non-volatile memory device and the volatile memory device, the controller configured to:
  receive a write request that includes a host logic block address (LBA) and data;
  determine whether the received LBA corresponds to the non-volatile memory device or the second memory region;
  in response to the received LBA corresponding to the non-volatile memory device:
   determine, based on the address mapping table, a physical address of the non-volatile memory device corresponding to the received LBA; and
   write the included data to the physical address of the non-volatile memory device; and
  in response to the LBA corresponding to the second memory region, write the included data to the second memory region based on the LBA.

2. The SSD of claim 1, wherein to write the included data to the second memory region based on the received LBA, the controller is configured to:
 convert the received LBA to a corresponding physical address of the second memory region; and
 write the included data to the corresponding physical address of the second memory region.

3. The SSD of claim 1, wherein the controller is further configured to:
 receive a read request that includes the LBA;
 determine whether the received LBA corresponds to the non-volatile memory device or the second memory region;
 in response to the received LBA corresponding to the non-volatile memory device:
  determine, based on the address mapping table, the physical address of the non-volatile memory device corresponding to the received LBA; and
  read data from the determined physical address of the non-volatile memory device; and
 in response to the received LBA corresponding to the second memory region, read data from a physical address of the second memory region corresponding to the received LBA.

4. The SSD of claim 1, wherein, in response to a power down event, the controller is further configured to:
 write data stored in the second memory region to the non-volatile memory device as backup data.

5. The SSD of claim 4, wherein, in response to a power up event, the controller is further configured to:
 write the backup data stored in the non-volatile memory device to the second memory region.

6. The SSD of claim 1, wherein, to determine the physical address of the non-volatile memory device corresponding to the received LBA, the controller is configured to:
 allocate the physical address from available physical addresses to correspond to the received LBA; and
 update the address mapping table to indicate the physical address corresponds to the received LBA.

7. The SSD of claim 1, wherein the non-volatile memory device is a NAND flash memory device.

8. The SSD of claim 1, wherein the volatile memory device is a double data rate (DDR) memory device.

9. A method for writing to a solid-state drive (SSD) that includes a non-volatile memory device and a volatile memory device, the volatile memory device including first and second memory regions, the first memory region storing an address mapping table, the method comprising:
 receiving a write request that includes a host logic block address (LBA) and data;
 determining whether the received LBA corresponds to the non-volatile memory device or the second memory region;
 in response to the received LBA corresponding to the non-volatile memory device:
  determining, based on the address mapping table, a physical address of the non-volatile memory device corresponding to the received LBA; and
  writing the included data to the determined physical address of the non-volatile memory device; and
 in response to the received LBA corresponding to the second memory region, writing the included data to the second memory region based on the received LBA.

10. The method of claim 9, wherein said writing the included data to the second memory region based on the received LBA comprises:
 converting the received LBA to a corresponding physical address of the second memory region; and
 writing the included data to the corresponding physical address of the second memory region.

11. The method of claim 9, further comprising:
 in response to a power down event, writing data stored in the second memory region to the non-volatile memory device as backup data.

12. The method of claim 11, further comprising:
 in response to a power up event, writing the backup data stored in the non-volatile memory device to the second memory region.

13. The method of claim 9, wherein said determining, based on the address mapping table, a physical address of the non-volatile memory device corresponding to the received LBA comprises:
 allocating the physical address from available physical addresses to correspond to the received LBA; and
 updating the address mapping table to indicate the physical address corresponds to the received LBA.

14. The method of claim 9, wherein the non-volatile memory device is a NAND flash memory device.

15. The method of claim 9, wherein the volatile memory device is a double data rate (DDR) memory device.

16. A solid-state drive (SSD) controller configured to write to a non-volatile memory device and a volatile memory device, the volatile memory device including first and second memory regions, the first memory region storing an address mapping table, the solid-state drive controller further configured to:
 receive a write request that includes a host logic block address (LBA) and data;

determine whether the received LBA corresponds to the non-volatile memory device or the second memory region;

in response to the received LBA corresponding to the non-volatile memory device:
  determine, based on the address mapping table, a physical address of the non-volatile memory device corresponding to the received LBA; and
  write the included data to the determined physical address of the non-volatile memory device; and in response to the received LBA corresponding to the second memory region, write the included data to the second memory region based on the received LBA.

17. The SSD controller of claim 16, wherein to write the included data to the second memory region based on the received LBA, the SSD controller is configured to:
  convert the received LBA to a corresponding physical address of the second memory region; and
  write the included data to the corresponding physical address of the second memory region.

18. The SSD controller of claim 16, further configured to:
receive a read request that includes the LBA;
determine whether the received LBA corresponds to the non-volatile memory device or the second memory region;

in response to the received LBA corresponding to the non-volatile memory device:
  determine, based on the address mapping table, the physical address of the non-volatile memory device corresponding to the received LBA; and
  read data from the physical address of the non-volatile memory device; and in response to the received LBA corresponding to the second memory region, read data from a physical address of the second memory region corresponding to the received LBA.

19. The SSD controller of claim 16, further configured to, in response to a power down event, write data stored in the second memory region to the non-volatile memory device as backup data.

20. The SSD controller of claim 19, further configured to, in response to a power up event, write the backup data stored in the non-volatile memory device to the second memory region.

* * * * *